Feb. 19, 1957   A. L. BROCKWAY, JR., ET AL   2,782,409
SYSTEM FOR PROJECTING MOVABLE LINES ON A CRT FACE
Filed Sept. 17, 1952   2 Sheets-Sheet 1

ARTHUR L. BROCKWAY, JR.
HENRY P. DANTZIG
*INVENTOR.*

BY
Killman, Kerst and Pfund
ATTORNEYS

Feb. 19, 1957  A. L. BROCKWAY, JR., ET AL  2,782,409
SYSTEM FOR PROJECTING MOVABLE LINES ON A CRT FACE
Filed Sept. 17, 1952  2 Sheets-Sheet 2
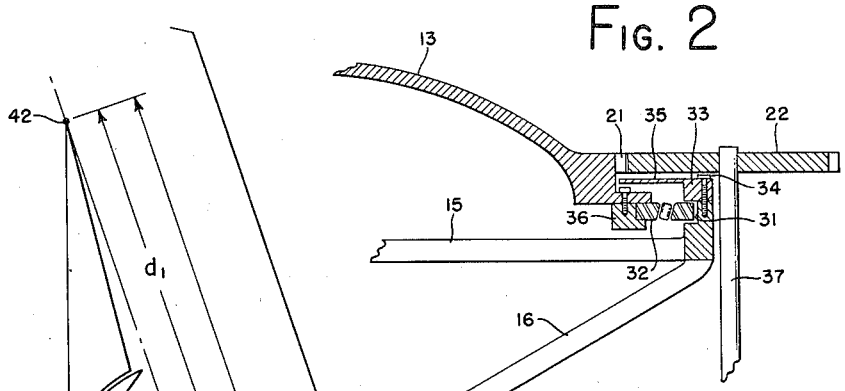
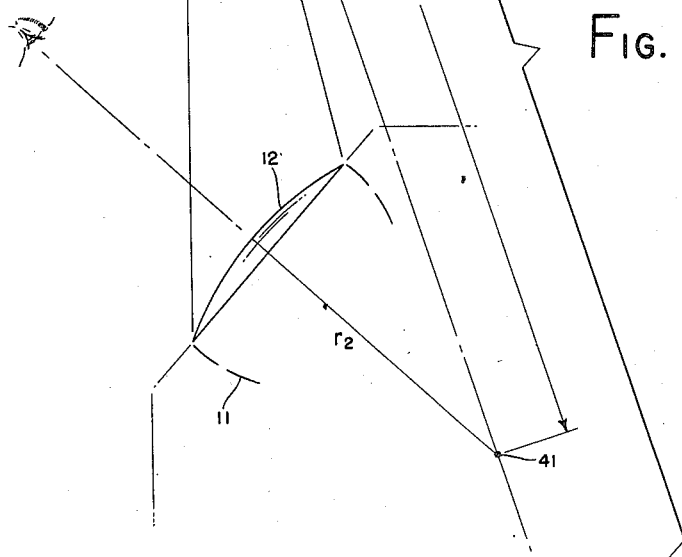
ARTHUR L. BROCKWAY, JR.
HENRY P. DANTZIG
*INVENTOR.*
BY
*Killman, Kerst and Pfund*
ATTORNEYS United States Patent Office 2,782,409
Patented Feb. 19, 1957

2,782,409

SYSTEM FOR PROJECTING MOVABLE LINES ON A C. R. T. FACE

Arthur L. Brockway, Jr., and Henry P. Dantzig, Baltimore, Md., assignors to Bendix Aviation Corporation, Towson, Md., a corporation of Delaware Application September 17, 1952, Serial No. 310,082

4 Claims. (Cl. 340—369)

This invention relates generally to the projection of indicia upon a spherical surface and more particularly to arrangements which permit the projection of undistorted movable indicia upon such surfaces, for example, the face of a cathode ray tube.

Many prior art arrangements exists for the plotting of lines, maps and the like upon the spherical face of a cathode-ray tube for the purpose of measuring and comparing or identifying the fluorescent image appearing thereon. These devices have been in the form of a scale directly placed upon the cathode ray tube or projections using partially reflecting and partially transparent mirrors placed before the cathode ray screen to superimpose the image thereon with a desired index or plot and similar arrangements. These latter devices have the obvious disadvantage of placing an obstruction in the optical path for viewing the fluorescent screen. The fixed scales placed directly upon the cathode ray tube surface suffer from the difficulty of changing and adjusting such a chart with respect to the fluorescent image. The projection of a fixed line upon a cathode ray screen has been successfully accomplished heretofore using a suitable plain transparency of the desired image but such projections are not movable across the spherical tube face without the introduction of distortion.

Accordingly, it is an object of this invention to provide a projected image movable upon a spherical surface without distortion.

Another object is to provide a desired index upon a spherical cathode-ray tube screen without interposing any optical obstructions in front of the screen.

A further object is to provide an improved compact plotting system for a cathode-ray tube.

Another object is to provide a spherical transparency for projecting upon a spherical surface an image which is movable thereon without distortion.

These and other objects are provided and the limitations and disadvantages of prior art arrangements of this type are overcome with the present invention by obliquely projecting upon a spherical cathode-ray tube face an image formed as a transparency in a spherical shell. The spherical shell is arranged to move in such a manner that the projected image remains undistorted for all positions thereof. In this manner the projected image is superimposed upon the cathode ray tube screen and no obstacles appear in the direct viewing path thereto.

The invention may be better understood by reference to the following detailed description taken in conjunction with the accompanying drawings, wherein:

Fig. 2 is a sectional view along the lines 2—2 of Fig. 1; and

Fig. 3 is a diagram taken through the vertical plane of symmetry of Fig. 1 showing the relation of the components for practicing the invention.

Figure 1:
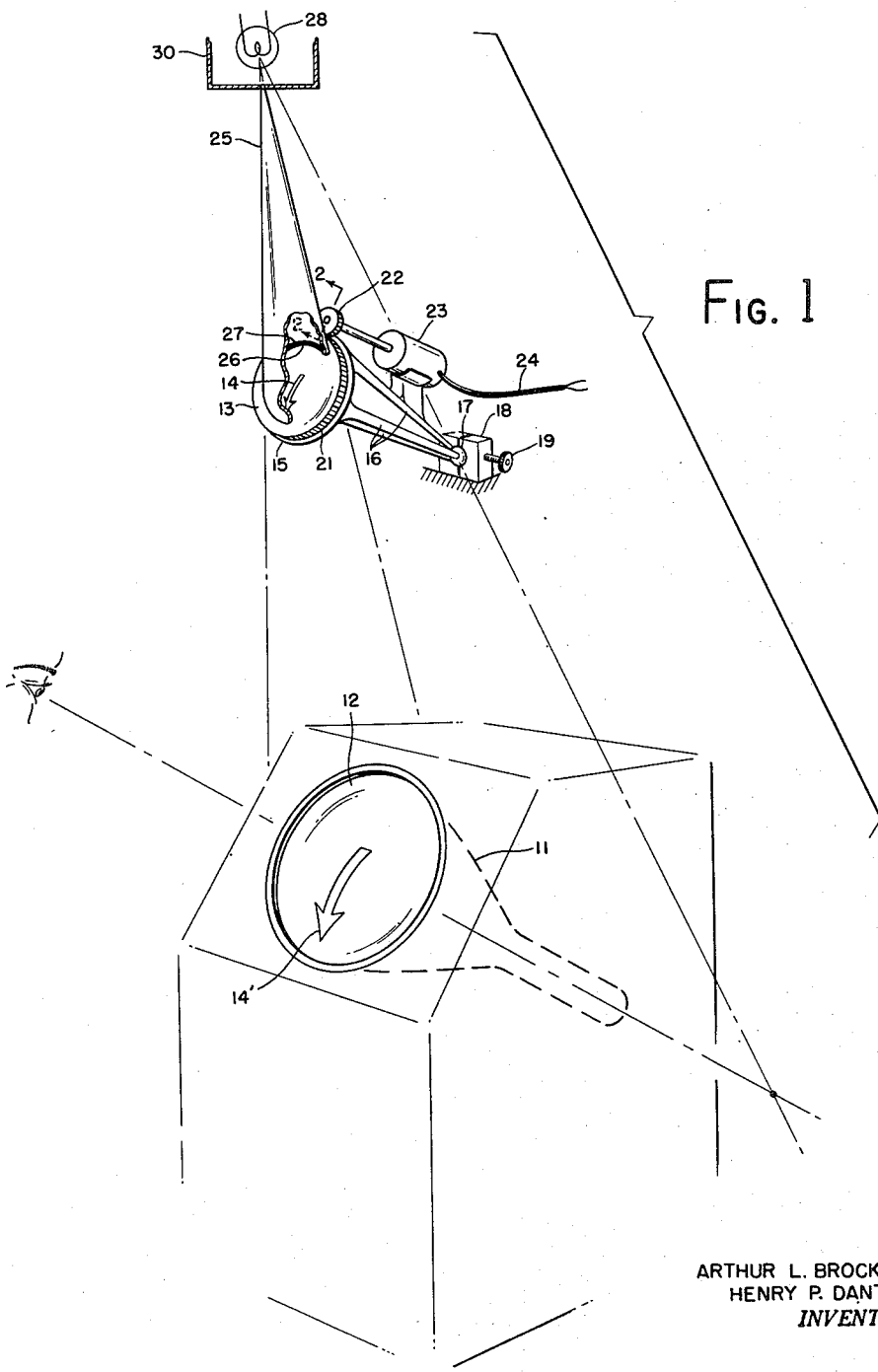
Fig. 1 is a pictorial view of the invention in accordance with the present preferred embodiment.

Referring now to Fig. 1, there is shown a cathode ray tube 11 mounted at an angle for convenient viewing and having a spherical viewing screen 12. Out of line with the direction of viewing the screen 12, there is positioned a thin spherical shell segment 13 which is substantially opaque to the light which is to be used to project the image. The shell 13 has a transparent portion 14 corresponding to the indexing image which it is desired to produce. The shell 13 is rotatably mounted in a circular frame 15 having leg members 16 which converge to a common point and terminate in a ball 17. The ball 17 is rotatably secured in a socket member 18 which is attached to a fixed support. The spherical segment 13 is thus positionable at all points in the hemisphere on one side of the joint formed by ball 17 and socket 18 and may be secured in any desired position by tightening the socket 18 upon the ball 17 with a hand screw 19.

The shell 13 has a ring gear 21 mounted thereon in peripheral arrangement and is driven by engagement with a spur gear 22. The gear 22 is positioned by a servo motor 23 which is mounted upon the legs 16 for movement with the frame and leg assembly. The servo motor 23 is energized via flexible cable 24 in accordance with any desired signal.

Mounted above the shell 13 is a conical hood 25 which has a spherical opening 26 in the base thereof slightly spaced from the surface of the shell 13. The hood 25 may have a projecting felt strip 27 to provide a tight light-seal between the edge 26 and the shell 13. At the open apex of the cone 25 is located a point source of light 28 enclosed in a housing 30.

The geometrical arrangement which is required of the components described in Fig. 1 will more fully appear hereinafter with reference to Fig. 3. A suitable arrangement for the rotating mechanism of the shell 13 will first be described with reference to Fig. 2.

The circular frame 15 has an inner recessed portion 31 adapted to seat one race of a ring bearing 32 which is clamped by lug 33, by means of a suitable fastener, such as bolt 34. The lug 33 has an extended flange 35 which acts as a circular cover plate for the ring gear 32. The other race of the bearing 32 is secured to and supports the shell 13 by means of a bolt secured lug 36. The ring gear 21 is in driven engagement with the spur gear 22, which is driven by a shaft 37 from the servo motor 23, as hereinbefore described. By means of this arrangement the spherical shell 13 is thus rotatably supported on the circular ring 15 and rotatably positioned with respect thereto by the rotation of the gear 22.

Referring now to Fig. 3, the required relation among the several components will be described. The spherical surface 12 of the cathode ray tube 11, in its mounted position, has a center of curvature 41 at the end of a radius $r_2$. At any suitable point 42, from which a light may be projected upon the face 12 of tube 11 and which is out of the viewing path, is located the point source of light 28. Upon the line joining the points 41 and 42, a point 43 is selected for the center of rotation of the shell 13 and, for the system as described in Fig. 1, locates a center of the ball and socket joint 17, 18. The spherical segment 13 has a radius of $r_1$ and is supported so that it moves about the point 43 on a radius $r_1$. The motion of the shell 13 thus never departs from the locus of a sphere of radius $r_1$ with a center at the point 43. The required relation among the components of the present invention to assure that any transparent figure in the shell 13 will be projected by a point source of light at the point 42 upon the spherical surface 12 and that the image so projected remains undistorted for any motion of the transparency on the aforementioned locus, is as follows:

$$\frac{r_1}{r_2} = \frac{d_1}{d_2}$$

where $d_1$ is the distance between point 42 and point 43, and $d_2$ is the distance between point 42 and point 41.

The operation of the device of Fig. 1 constructed in accordance with the portions of Fig. 3 will now be described. A spherical shell 13 is selected having a suitable transparent portion 14 therein and the image thereof 14' is initially adjusted by suitably positioning the frame 15, 16 in the ball and socket joint 17, 18 to correspond to an initial orientation of some device such as a scanning antenna. As the antenna sweeps a sector of space with a directed beam, the motion thereof is transmitted by suitable signals to the servomotor 23 over cable 24. The sweeping motion of the antenna reversibly drives the servomotor 23 to cause the rotation back and forth of the shell 13 in the frame 15, thus causing a sweeping motion of the image 14' on the spherical surface 12. The image 14' remains undistorted for all positions thereof. For example, if the transparency 14 is a line representing an antenna radiation direction, then that direction will appear as a straight line on the surface 12, i. e., an arc of a great circle.

It is to be understood that the term "light" as used herein is not limited to the visible spectrum but includes ultra-violet, infra-red, and other energy wavelengths which may energize the fluorescent screen of the tube or otherwise produce visible images thereon.

With regard to the image of the transparency on the spherical projection screen it will be apparent that any desired motion can be obtained by a combination of motions of the spherical shell 13. For example, in Fig. 1, one end of the arrow 14 can be positioned near the edge 26 of the cone 25 by suitable pivotal motion of the frame 15, 16 about the point 17. The resulting image 14' will then have a corresponding end positioned near the edge of the screen 12 and rotational motion of the shell 13 about a radius through the point 17 as an axis will provide an undistorted image with a corresponding motion on the screen 12. If the radial axis intersects the transparency 14, the projected point of intersection will remain stationary and the line image will sweep out a sector. Obviously the shell 13 must be sufficiently larger than the base opening in the cone 25 to permit the desired positioning of the index without impairing the light seal at the edge 26.

What is claimed is:

1. Means for projecting onto the spherical face of a cathode ray tube from a location in front of and displaced from the axis of the tube a replica of a rotatable indicium, said replica being undistorted for all possible positions of said indicium; said means comprising, a point source of light at said location, a spherical shell located between said point source of light and said face, said shell and said face having radii of curvature proportional to the respective distances from said location of corresponding points on their surfaces and having parallel axes of generation, the centers of curvature of said shell and said face defining with said point source of light a straight line, said shell being opaque except for a transparent area having the shape of said indicium, and means for rotating said shell about its axis of generation.

2. Means as set forth in claim 1, said means including a light tight housing extending from said point source of light to the periphery of said shell.

3. Means for projecting on to a first curved surface, generated by the rotation of a curve about an axis of generation, from a location in front of said surface and displaced from said axis, a replica of a rotatable indicium, said replica being undistorted for all possible positions of said indicium: said means comprising, a point source of light at said location, a shell having a second curved surface constituting a surface of rotation similar to said first curved surface and having an axis of generation parallel to that of said first surface, the radii of curvature at corresponding points of said curved surfaces being proportional to the respective distances of said points from said location, the centers of curvature of corresponding points of said surfaces defining with said point source of light a straight line, said shell being opaque except for a transparent area having the shape of said indicium, and means for rotating said shell about its axis of generation.

4. Means as set forth in claim 3, said means including a light tight housing extending from said point source of light to the periphery of said shell.

References Cited in the file of this patent
UNITED STATES PATENTS

| | | |
|---|---|---|
| 1,228,685 | Magowan | June 5, 1917 |
| 2,072,286 | Wellington | Mar. 2, 1937 |
| 2,077,111 | Kent | Apr. 13, 1937 |
| 2,251,984 | Cleaver | Aug. 12, 1941 |
| 2,316,550 | Bigalke | Apr. 13, 1943 |
| 2,435,564 | Atwood | Feb. 10, 1948 |
| 2,448,568 | Zwillinger et al. | Sept. 7, 1948 |
| 2,586,743 | Thresher | Feb. 19, 1952 |